(12) United States Patent
Hong et al.

(10) Patent No.: US 7,582,903 B2
(45) Date of Patent: Sep. 1, 2009

(54) THIN FILM TRANSISTOR ARRAY PANEL

(75) Inventors: Mun-Pyo Hong, Seongnam (KR);
Yong-Uk Lee, Seongnam (KR);
Bo-Sung Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 372 days.

(21) Appl. No.: 10/534,705

(22) PCT Filed: Mar. 4, 2003

(86) PCT No.: PCT/KR03/00415

§ 371 (c)(1),
(2), (4) Date: Dec. 5, 2005

(87) PCT Pub. No.: WO2004/044646

PCT Pub. Date: May 27, 2004

(65) Prior Publication Data

US 2006/0145156 A1 Jul. 6, 2006

(30) Foreign Application Priority Data

Nov. 14, 2002 (KR) .................. 10-2002-0070707

(51) Int. Cl.
*H01L 29/04* (2006.01)
*H01L 31/036* (2006.01)
*H01L 31/0376* (2006.01)
*H01L 31/20* (2006.01)

(52) U.S. Cl. .............................. 257/72; 257/59; 257/62

(58) Field of Classification Search .................. 257/59, 257/62, 72; 349/42–44
See application file for complete search history.

(56) References Cited

U.S. PATENT DOCUMENTS

| 6,335,211 | B1 | 1/2002 | Lee | |
|---|---|---|---|---|
| 6,448,579 | B1* | 9/2002 | Lim et al. | ...................... 257/59 |
| 6,486,933 | B1* | 11/2002 | Cha et al. | ................... 349/139 |
| 6,654,094 | B2* | 11/2003 | Wu | ............................. 349/187 |
| 2001/0017372 | A1* | 8/2001 | Koyama | ...................... 257/72 |
| 2002/0093016 | A1* | 7/2002 | Lim et al. | ...................... 257/59 |
| 2002/0158995 | A1* | 10/2002 | Hwang et al. | ................. 349/43 |

FOREIGN PATENT DOCUMENTS

| JP | 60128486 | 7/1985 |
|---|---|---|
| JP | 03058030 | 3/1991 |
| JP | 03148636 | 6/1991 |
| JP | 04050920 | 2/1992 |
| JP | 04280231 | 10/1992 |

(Continued)

OTHER PUBLICATIONS

International Search Report; PCT/KR03/00415; Aug. 19, 2003. All references cited in the Search Report and not previously submitted are listed above.

*Primary Examiner*—Shouxiang Hu
(74) *Attorney, Agent, or Firm*—Cantor Colburn LLP

(57) ABSTRACT

A thin film transistor array panel according to the present invention includes: an insulating substrate; a gate wire formed on the insulating substrate and including a plurality of gate portions and a gate connection connecting the gate portions; a data wire insulated from the gate wire and intersecting the date wire; a thin film transistor connected to the gate wire and the data wire; and a pixel electrode connected to the thin film transitor.

10 Claims, 14 Drawing Sheets

FOREIGN PATENT DOCUMENTS

| | | |
|---|---|---|
| JP | 05119332 | 5/1993 |
| JP | 10048651 | 2/1998 |
| JP | 11052426 | 2/1999 |
| JP | 11095256 | 4/1999 |
| JP | 2000010120 | 1/2000 |
| JP | 2001005038 | 1/2001 |
| JP | 2001021894 | 1/2001 |
| JP | 2001051303 | 2/2001 |
| JP | 2001215483 | 8/2001 |
| JP | 2001235752 | 8/2001 |
| JP | 2001281704 | 10/2001 |
| JP | 2001318624 | 11/2001 |
| JP | 2002090776 | 3/2002 |
| KR | 19940022873 | 10/1994 |
| KR | 100190035 | 1/1999 |
| KR | 100213191 | 5/1999 |
| KR | 1020000073727 | 12/2000 |
| KR | 1020010082841 | 8/2001 |
| KR | 1020010082842 | 8/2001 |
| KR | 1020020007037 | 1/2002 |

* cited by examiner

THIN FILM TRANSISTOR ARRAY PANEL

BACKGROUND OF THE INVENTION (a) Field of the Invention

The present invention relates to a thin film transistor array panel and a manufacturing method thereof.

(b) Description of the Related Art

A thin film transistor (TFT) array panel is widely unused in various display devices such as a notebook computer, a monitor, a television set, a mobile phone, etc. A thinner, lighter, cheaper, and strong flexible panel is required. The flexible panel may include a flexible substrate on which TFTs are formed.

A flexible substrate includes a plastic substrate having high heat-resistance, high transmittance, and low contractibility, an extremely thin glass substrate which is hardly broken and easily bent, or a hybrid thereof.

However, a flexible substrate is apt to be curved by stress when it experiences chemical vapor deposition (CVD) or sputtering of a silicon or metal thin film.

The stress exerted on a substrate, which is generated by deposition of a gate wire, a data wire, or an amorphous silicon layer, etc., may be released when they are patterned by photo-etching. However, the stress in a direction along the length of the gate wire or the data wire is not easily released. In addition, since only a small portion of an entire area of a gate insulating layer and a passivation layer experience etching, the stress maintains until the termination of a process to cause curve of the substrate.

The curvature of the substrate causes problems or impossibility in misalignment in following photolithography processes and in incomplete evacuation in following coating processes. In addition, there is a problem that the curved or crookedly display panel lowers the value of the products.

SUMMARY OF THE INVENTION

In order to overcome the above-described problems, the present invention provides a thin film transistor array panel and a manufacturing method thereof divides a gate wire, a data wire, a passivation layer, and a gate insulating layer into a plurality of patterns such that the stress exerted on the substrate is minimized.

In order to achieve the solution, a thin film transistor array panel according the present invention includes: an insulating substrate; a gate wire formed on the insulating substrate and including a plurality of gate portions and a gate connection connecting the gate portions; a data wire insulated from the gate wire and intersecting the gate wire; a thin film transistor connected to the gate wire and the data wire; and a pixel electrode connected to the thin film transistor. The data wire includes a plurality of data portions and a data connection connecting the data portions.

The thin film transistor array panel may further include a gate insulating layer insulting the gate wire and the data wire and including a plurality of portions and a passivation layer covering the thin film transistors and including a plurality of portions.

A thin film transistor array panel according to another embodiment of the present invention includes: an insulating substrate; a gate wire formed on the insulating substrate; a gate insulating layer formed on the gate wire and including first and second contact holes; a semiconductor layer formed on a predetermined area of the gate insulating layer; an ohmic contact layer formed on the semiconductor layer and having a shape substantially the same as the semiconductor layer except for a predetermined area of the semiconductor layer; a data wire insulated from the gate wire, intersecting the gate wire, and overlapping the ohmic contact layer at least in part; a passivation layer formed on the data wire and having a third contact hole exposing the data wire; a pixel electrode formed on the passivation layer and connected to the data wire through the third contact hole, wherein the gate wire includes first and second gate wire portions and a gate connection formed on the same layer as the data wire, and the first and the second gate wire portions are connected to the gate connection through the first contact holes.

The data wire preferably includes first and second data wire portions and a data connection formed on the same layer as the gate wire, and the first and the second data wire portions are connected to the data connection through the second contact holes.

The first and the second gate wire portion may include a gate line extending in a direction and a gate electrode, which is a portion of the gate line, and the first gate wire portion further comprises a gate pad provided at an end of the gate line. The first and the second data wire portion may include a data line extending in a direction, a source electrode, which is a portion of the data line and overlaps the ohmic contact layer in part, and a drain electrode located opposite the source electrode and overlapping the ohmic contact layer in part, and the first data wire portion further comprises a data pad provided at an end of the data line.

The gate wire and the data wire intersect to define a pixel area, and portions of at least one of the gate insulating layer and the passivation layer in the pixel electrode are removed. The gate insulating layer and the passivation layer are preferably divided into a plurality of portions by an opening extending parallel to the gate wire, and the opening is preferably located between adjacent gate lines and connected to the predetermined area of the pixel area.

A method of manufacturing a thin film transistor array panel includes: forming first and second gate wire and a data connection on an insulating substrate; forming a gate insulating layer on the substrate; a semiconductor layer and an ohmic contact layer pattern on the gate insulating layer partly overlapping the gate wire; forming first and second contact holes in the gate insulating layer; forming a gate connection connected to the first and the second gate wires through the first contact holes and first and second data wires partly overlapping the ohmic contact layer pattern connected to the data connection through the second contact holes on the substrate; forming an ohmic contact layer by etching the ohmic contact layer pattern by using the data wire as a mask; forming a passivation layer having a third contact hole on the substrate; and forming a pixel electrode connected to the data wire through the third contact hole on the passivation layer.

The formation of the first and the second contact holes includes formation of an opening for separating the gate insulating layer in the gate insulating layer.

The formation of the passivation layer includes formation of an opening for separating the passivation layer in the passivation layer.

BRIEF DESCRIPTION OF THE DRAWINGS

FIGS. 2A-5C are layout views sequentially illustrating a method of manufacturing a TFT array panel according to an embodiment of the present invention;

FIGS. 2B and 2C to FIGS. 5B to 5C are sectional views taken along the section lines shown in FIGS. 2A to 5A;

Figure 1A:
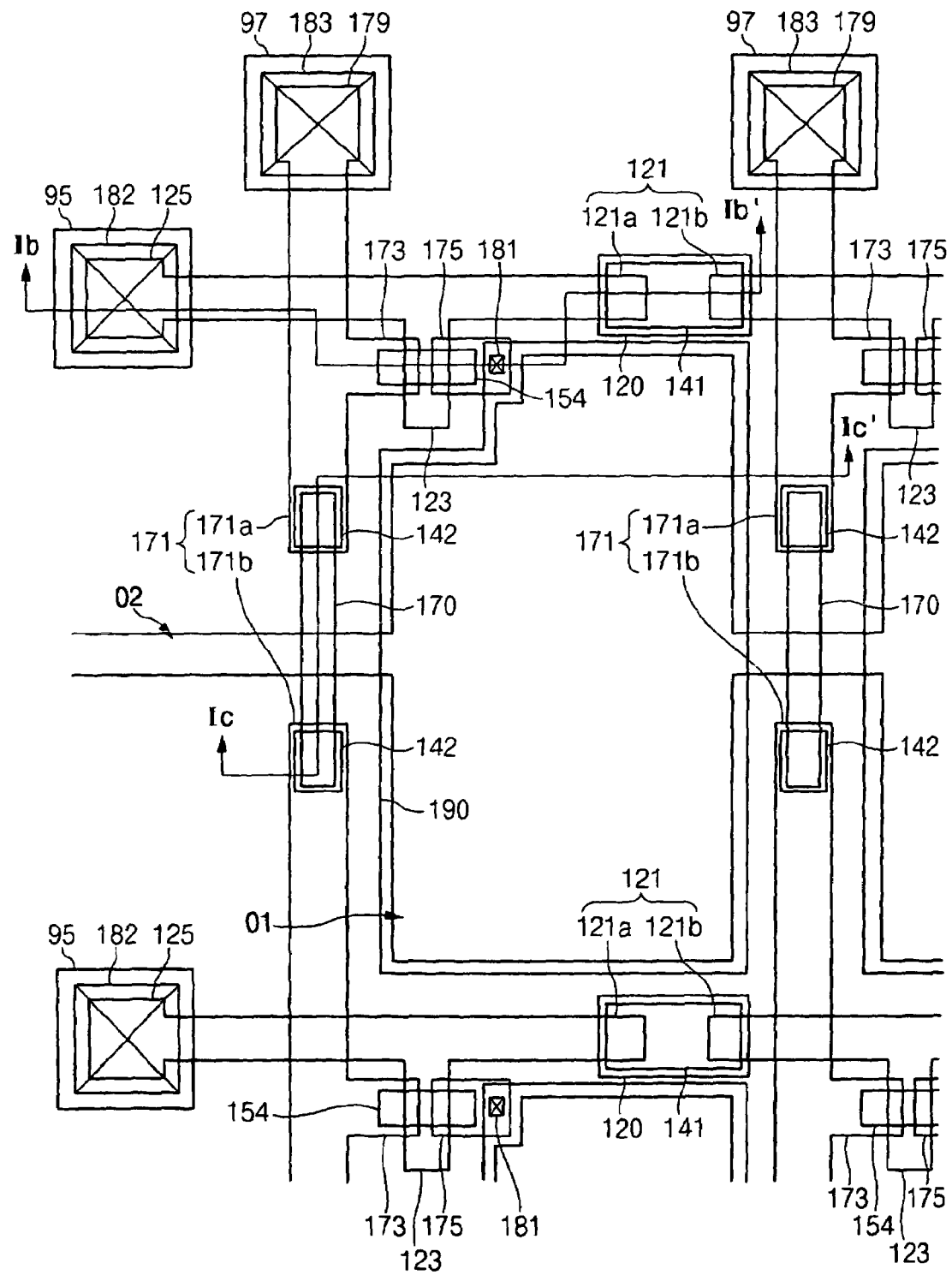
FIG. 1A is a layout view of a TFT array panel according to a first embodiment of the present invention.

* Description of Reference Numerals in the Drawings *

| | |
|---|---|
| 110: | insulating substrate |
| 120, 121, 123, 125: | gate wire |
| 140: | gate insulating layer |
| 141, 142, 143: | first to third contact holes |
| 170, 171, 173, 175, 179: | data wire |
| 180: | passivation layer |
| 181, 182, 183: | fourth to sixth contact holes |
| O1, O2: | opening |

DETAILED DESCRIPTION OF THE PREFERRED EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, TFT array panels according to embodiments of the present invention will be described with reference to the accompanying drawings.

First to Fifth Embodiment

Figure 1B:
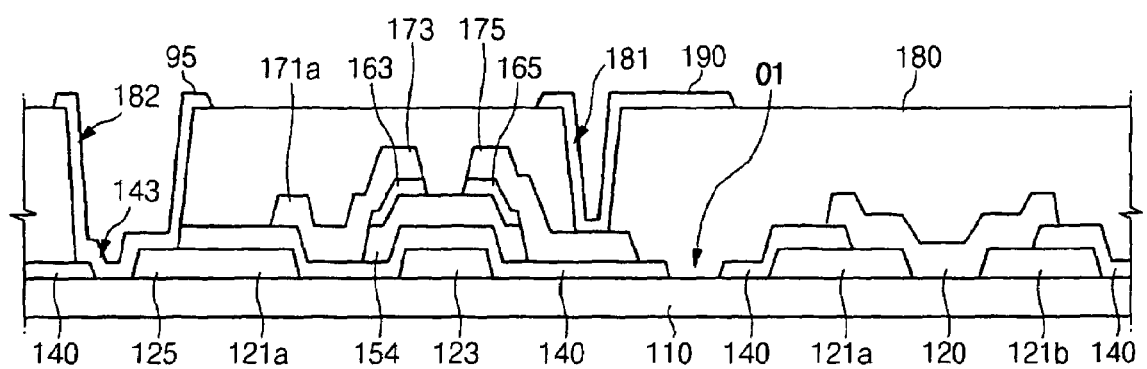
FIGS. 1B and 1C are sectional views of the TFT array panel shown in FIG. 1A taken along the lines Ib-Ib' and Ic-Ic'.
Figure 1C:
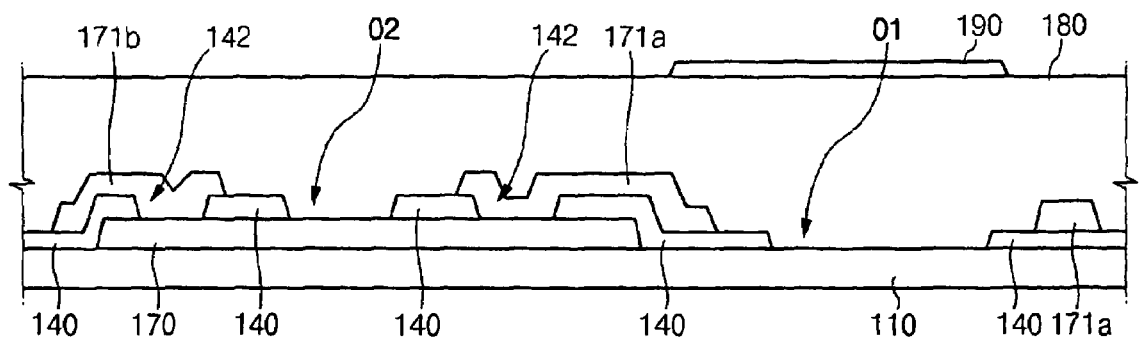

FIG. 1A is a layout view of a TFT array panel according to a first embodiment of the present invention, and FIGS. 1B and 1C are sectional views of the TFT array panel shown in FIG. 1A taken along the lines Ib-Ib' and Ic-Ic'.

As shown in FIGS. 1A to 1C, portions 121a, 121b, 123 and 125 of a gate wire and a data connection 170 are formed on a transparent insulating substrate 110.

The gate wire 120, 121, 123 and 125 includes a plurality of gate lines 121, a plurality of gate electrodes 123, a plurality of gate pads 125, and a plurality of gate connections 120. The gate lines 121 extend substantially in a transverse direction and have a plurality of singularities. The gate electrodes 123 are connected to the gate lines 121, and the gate pads 125 are provided at one ends of the gate lines 121 and receive gate signals to transmit the gate lines 121.

Each gate line 121 includes a first gate line portion 121a provided with the gate pad 125 and a plurality of second gate line portions 121b without the gate pads 125. The number of the first gate line portion 121a is one, while the number of the second gate line portions 121b is several, and they are separated apart from each other by a predetermined distance.

The gate connections 120 are formed on the same layer as data pads 179, which will be described layer, and connected to the disconnected portions of the gate lines 121 through first contact holes 141 to electrically connect them.

The data connections 170 extend perpendicular to the gate lines 121 and they are separated from the gate lines 121 by a predetermined distance.

A gate insulating layer 140 is entirely formed on the substrate including the portions 121, 123 and 125 of the gate wire and the data connections 170. The gate insulating layer 140 has a plurality of first contact holes 141 exposing portions of the first gate line portions 121a and the second gate line portions 121b, a plurality of second contact holes 142 exposing the data connections 170, and a plurality of third contact holes 143 exposing the gate pads 125.

Figure 6:
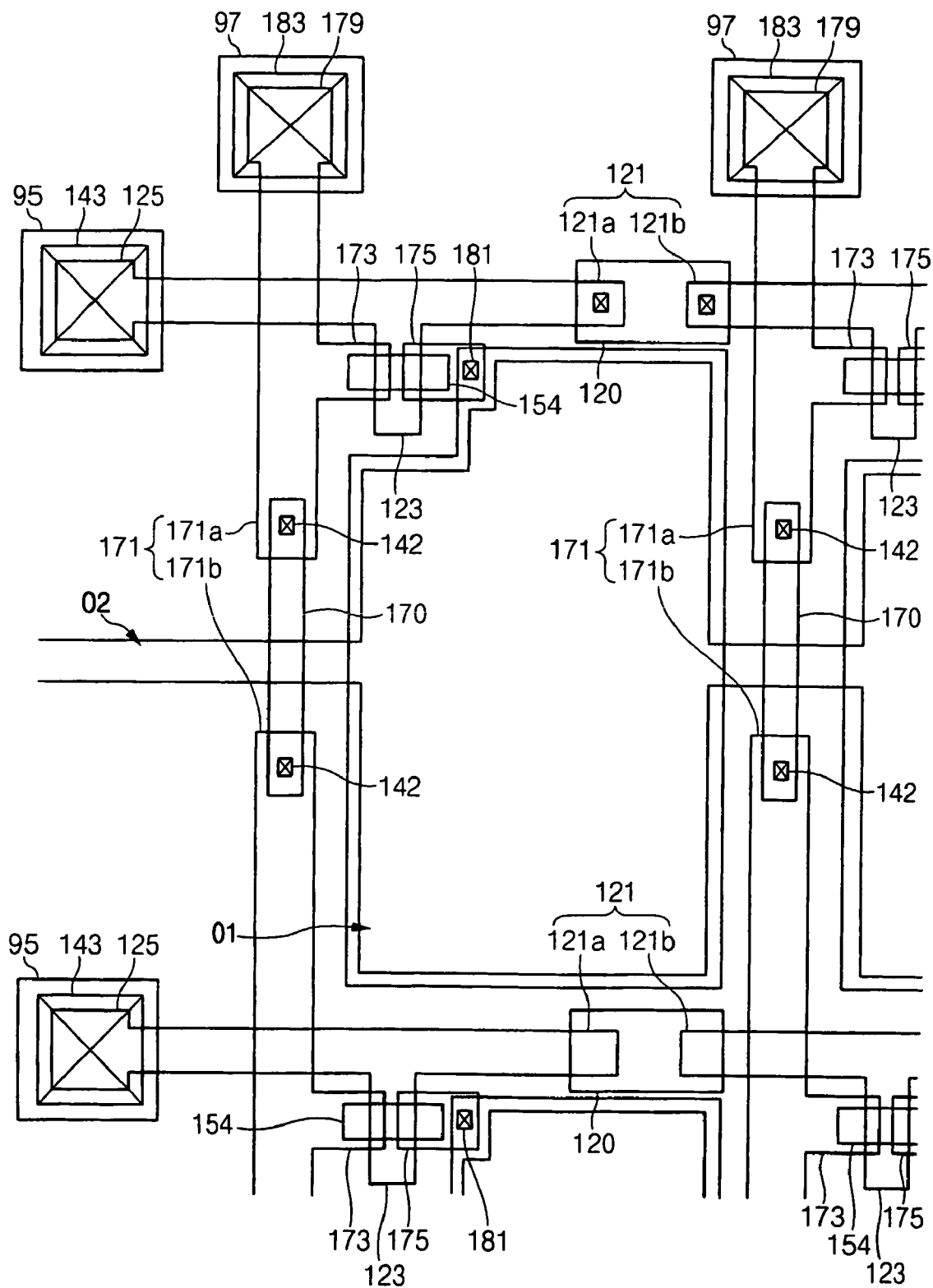
FIGS. 6-9 are layout views of TFT array panels according to second to fifth embodiments of the present invention.

The contact holes are formed as shown in FIG. 1A, or, as shown in FIG. 6, they are smaller than underlying metal wire (in a second embodiment). However, the metal wire has a dual-layered structure including Cr/Al and overetching of Al due to different etching ratios for Al and Cr may cause undercut. Accordingly, it is preferable that the contact holes are larger than the metal wire as in the first embodiment.

The gate insulating layer 140 has a plurality of sets of first and second openings O1 and O2 separating the gate insulating into upper and lower portions. In detail, the first openings O1 are formed by removing portions of the gate insulating layer 140 in pixel areas defined by the gate wire 120, 121, 123 and 125 and a data wire 170, 171, 173, 175 and 179), which will be described later, and the second openings O2 are located between the adjacent gate lines 121 and extend parallel to the gate lines 121 to separate the gate insulating layer 140 into a plurality of separated upper and lower portions. The second openings O2 are connected between the first openings O1.

Figure 7:
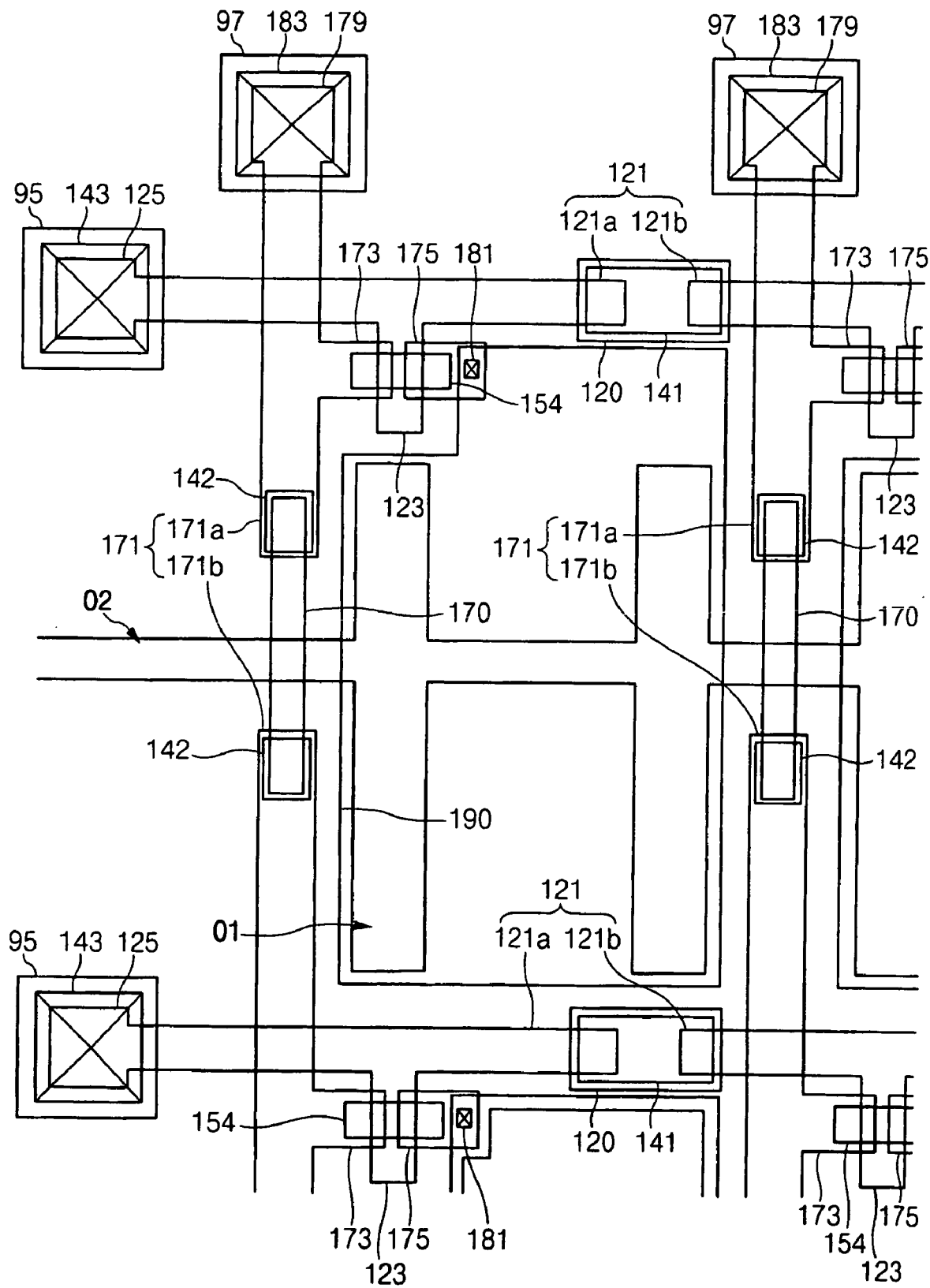
Figure 8:
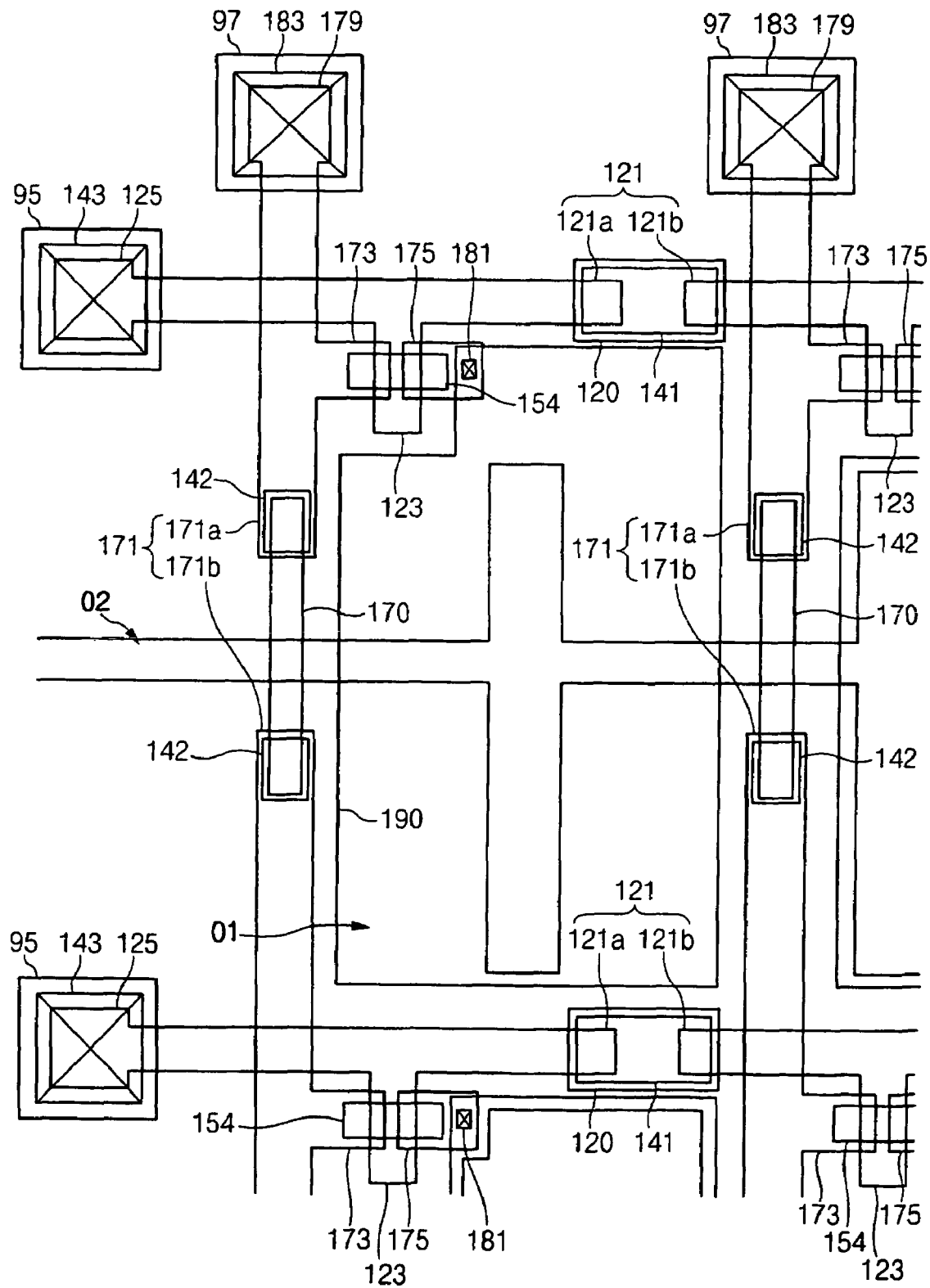

The first openings O1 has various shapes of the removed areas depending upon the stress exerted on the substrate 110 as shown in FIGS. 7 and 8 (in third and fourth embodiments). Any shapes of the removed areas are allowable.

A semiconductor layer 154 preferably made of amorphous silicon is formed on the gate insulting layer 140 opposite the gate electrodes 123, and an ohmic contact layer 163 and 165 preferably made of amorphous silicon heavily doped with impurity is formed thereon. The ohmic contact layer 163 and 165 includes a plurality of pairs of a drain contact 165 and a source contact 163, and it has the same planar shape as the semiconductor layer 154 except for predetermined portions of the semiconductor layer 154. The predetermined portions include channel portions between source electrodes 173 and drain electrodes 175.

A plurality of portions 171, 173, 175 and 179 of a data wire and a plurality of gate connections 120 are formed on the ohmic contact layer 163 and 165 and the gate insulating layer 140.

The data wire 170, 171, 173, 175 and 179 include a plurality of data lines 171, a plurality of source electrodes 173, a plurality of drain electrodes 175, a plurality of data pads 179, and a plurality of data connections 170. The data lines 171 have a plurality of singularities and extend perpendicular to the gate lines 121 to define a plurality of pixel areas. The source electrodes 173 are branched from the data lines 171 and partly overlap the source contacts 163, and the drain electrodes 175 are located opposite the source electrodes 173 with respect to the channel areas and partly overlap the drain contacts 165. The data pads 179 are connected to one ends of the data lines 171 and supplied data signals from an external device.

In addition, each data line 171 includes a first data line portion 171a provided with the data pads 179 and a plurality of second data line portions 171b without the data pads 179. The number of the first data line portion 171a is one, while the number of the second data line portions 171b is several, and they are separated apart from each other by a predetermined distance.

The data connections 170 are disposed on the same layer as the gate wire 121, 123 and 125 and connected to the data lines 171 through second contact holes 142.

A passivation layer 180 is formed on the data wire 171, 173, 175 and 179 and the gate connections 120. The passivation layer 180 is provided with forth to sixth contact holes 181-183. The fourth contact holes 181 expose the drain electrodes 175, the fifth contact holes 182 expose the gate pads 125, and the sixth contact holes 183 expose the data pads 179.

A plurality of pixel electrodes 190, a plurality of subsidiary gate pads 95, and a plurality of subsidiary data pads 97 are formed on the passivation layer 180. The pixel electrodes 190 are connected to the drain electrodes 175 through the fourth contact holes 181, the subsidiary gate pads 95 are connected to the gate pads 125 through the fifth contact holes 182, and the subsidiary data pads 97 are connected to the data pads 179 through the sixth contact holes 183.

The subsidiary gate pads 95 and the subsidiary data pads 97 are provided for compensating the adhesiveness with external devices and for protecting the pads 125 and 179 and their adoption is not indispensable but optional.

Figure 9:
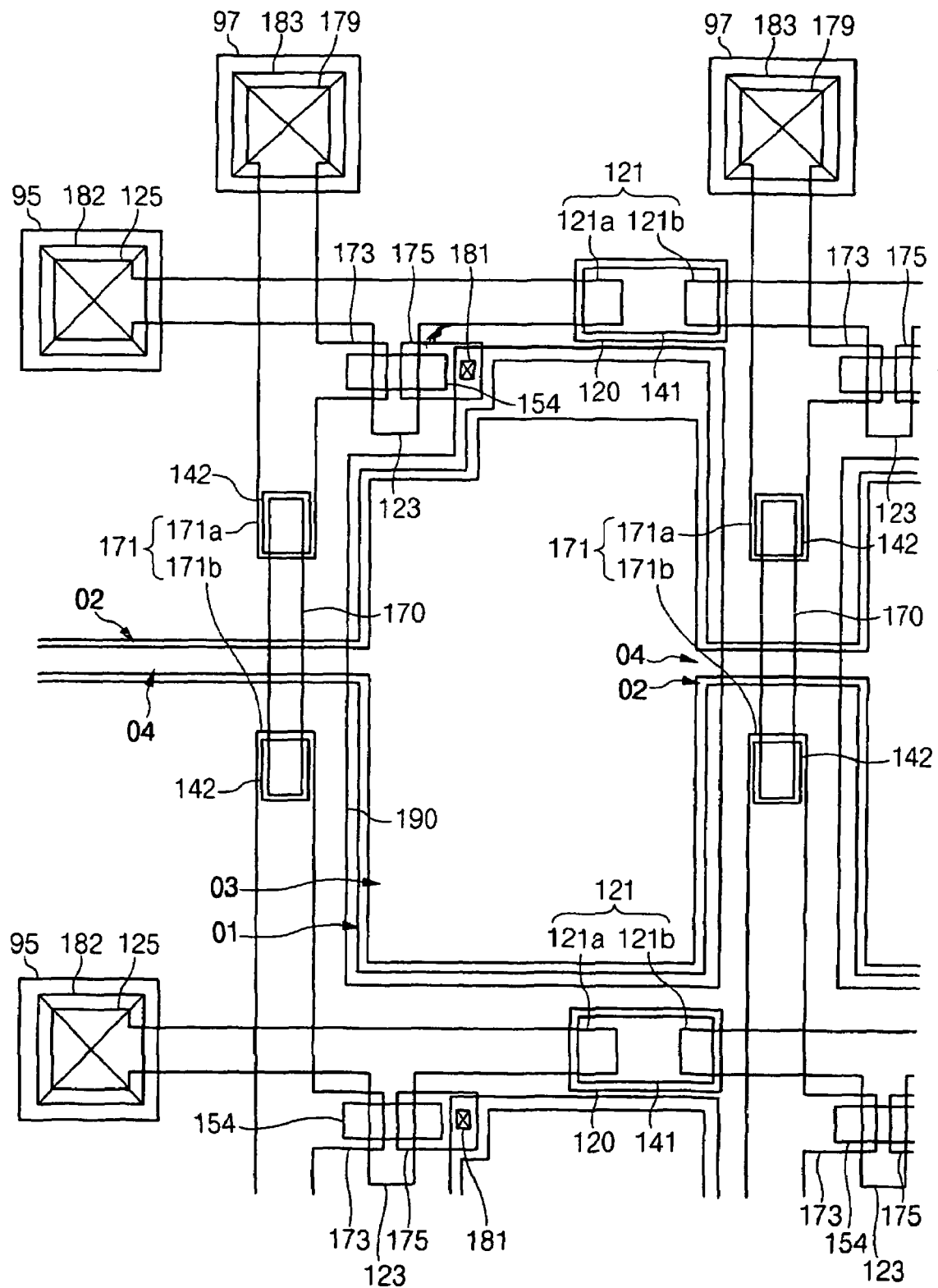

Predetermined portions of the passivation layer 180 may be removed like the gate insulating layer 140 (in a fifth embodiment). FIG. 9 is a layout view of a TFT array panel where predetermined portions of the gate insulating layer 140 and the passivation layer 180 are removed. As shown in the figure, a plurality of openings O3 in the pixel areas and a plurality of openings O4 extending parallel to the gate lines 121 are provided to further reduce the stress exerted on the substrate such that they separate the passivation layer 180 into upper and lower portions.

In this way, since predetermined intermediate portions of the gate wire 120, 121, 123 and 125 and the data wire 170, 171, 173, 175 and 179 are removed to separate the gate wire 120, 121, 123 and 125 and the data wire 170, 171, 173, 175 and 179 into a plurality of portions, the stress exerted along the length of the gate lines and the data lines are reduced.

In addition, although the gate insulating layer and the passivation in the conventional art covers entire surface of the substrate to severely exert the stress on the substrate, the present invention removes portions of those layers to reduce the stress, thereby decreasing the bend of the substrate.

A method of manufacturing the above-described TFT array panel is described with reference to FIGS. 2A-5C.

FIGS. 2A-5C are layout views sequentially illustrating a method of manufacturing a TFT array panel according to an embodiment of the present invention, and FIGS. 2B and 2C to FIGS. 5B to 5C are sectional views taken along the section lines shown in FIGS. 2A to 5A.

Figure 2A:
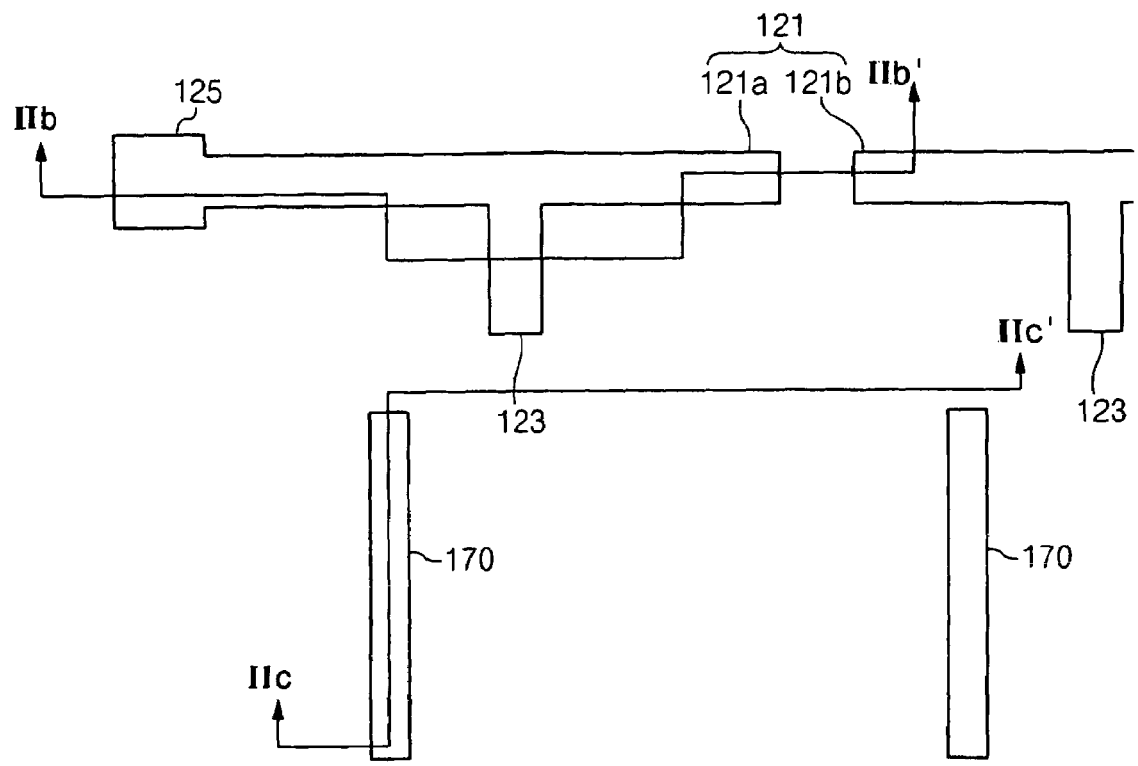
Figure 2A:
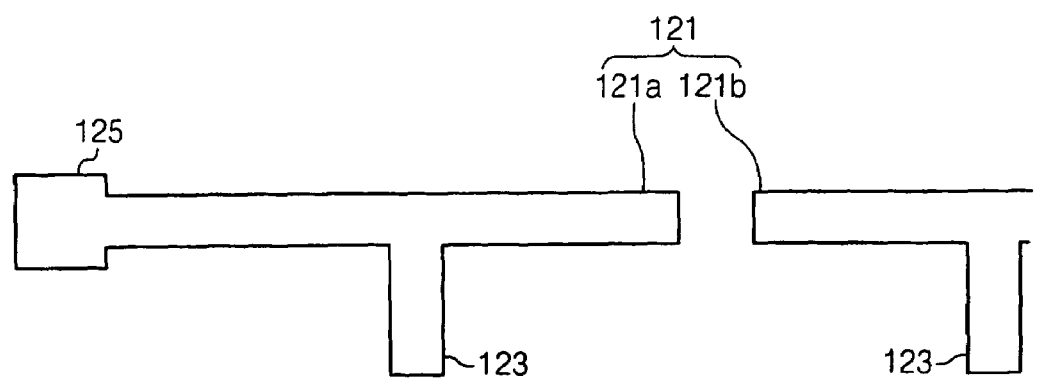
Figure 2B:
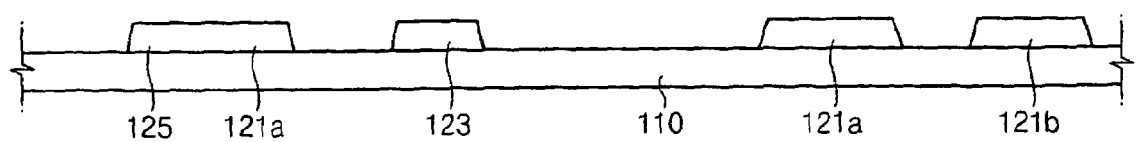
Figure 2C:

First, as shown in FIGS. 2A-2C, a metal layer is formed on a transparent insulating substrate 110 and patterned by photo-etching to form portions of a gate wire 121, 123 and 125 and a plurality of data connections 170.

Figure 3A:
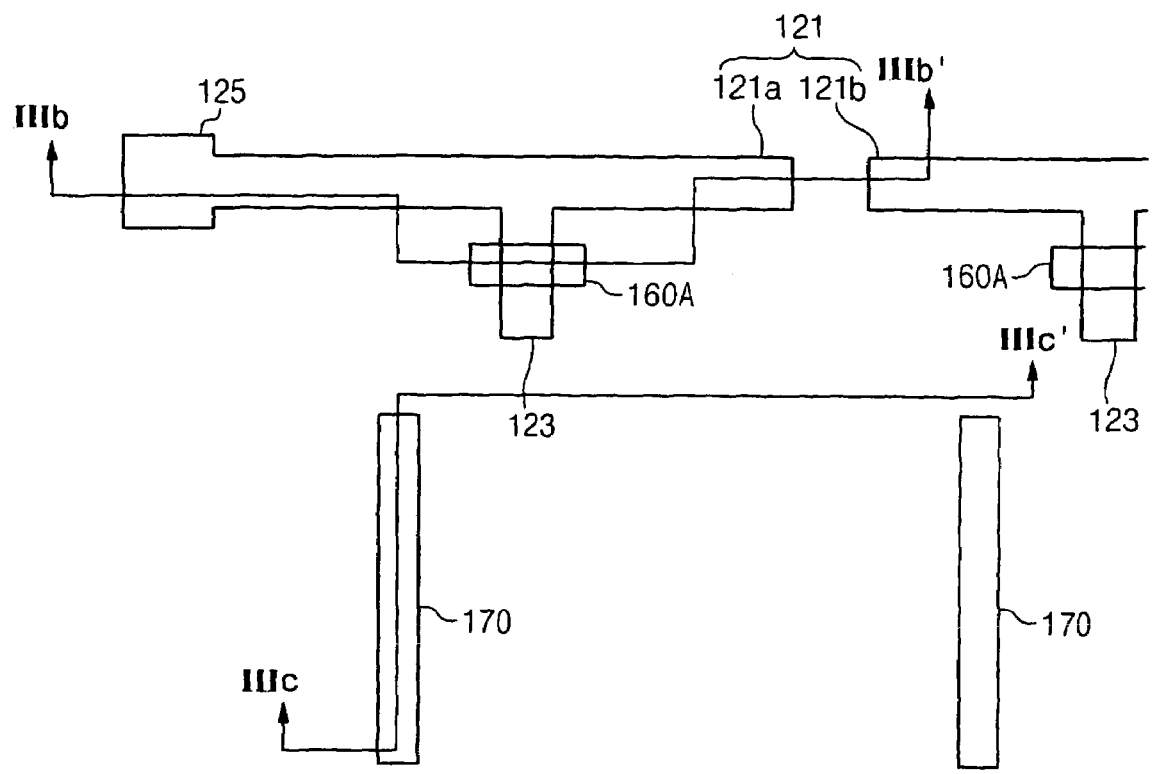
Figure 3A:
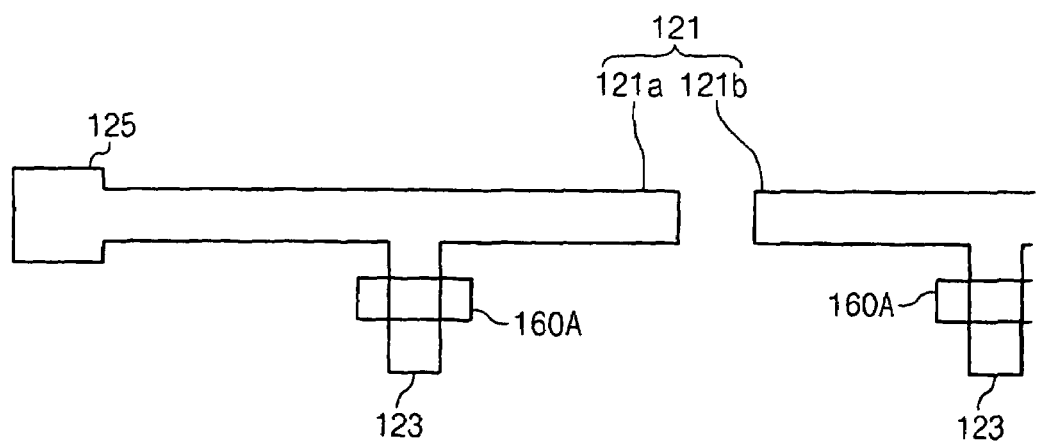
Figure 3B:
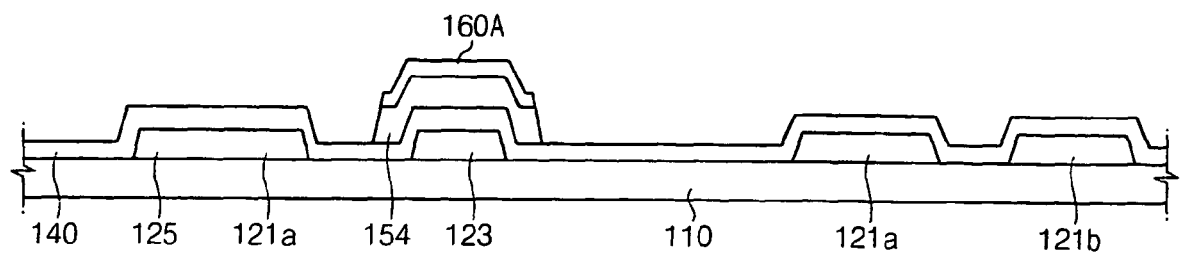
Figure 3C:
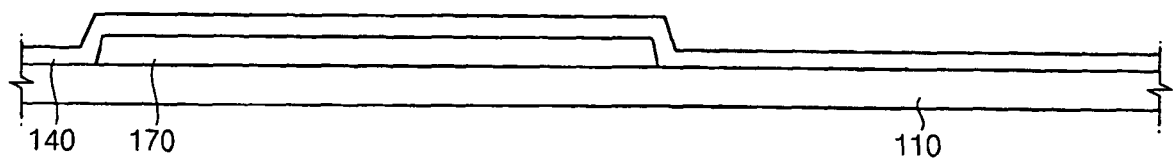

Referring to FIGS. 3A-3C, a gate insulating layer 140, an amorphous silicon layer without doping, and a doped amorphous silicon layer heavily doped with impurity are formed on the gate wire 121, 123 and 125 and the amorphous silicon layer and the doped amorphous silicon layer are photo-etched to form a semiconductor layer 154 and an ohmic contact layer pattern 160A directly on the gate insulating layer 140 opposite the gate electrodes 123.

Figure 4A:
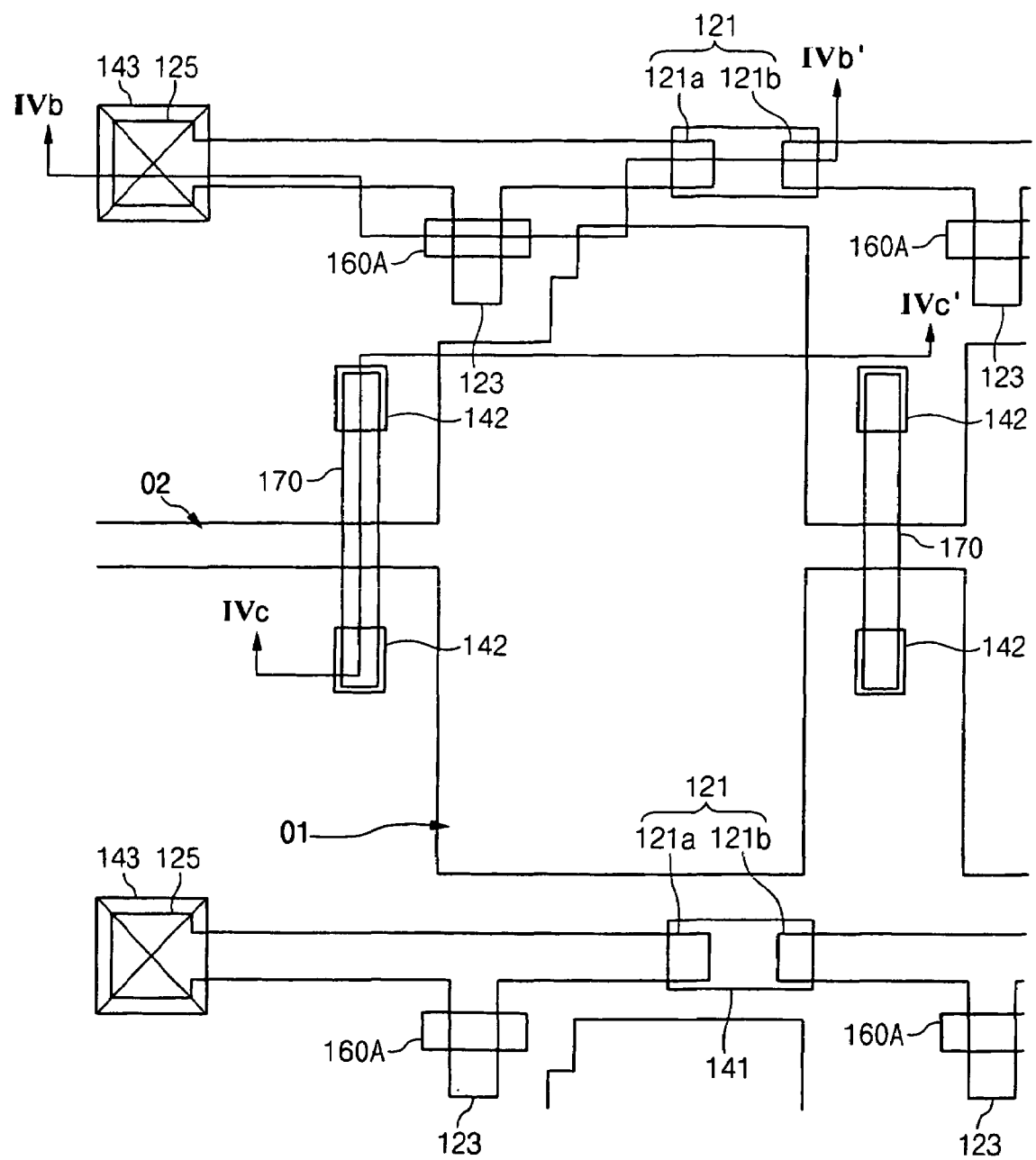
Figure 4B:
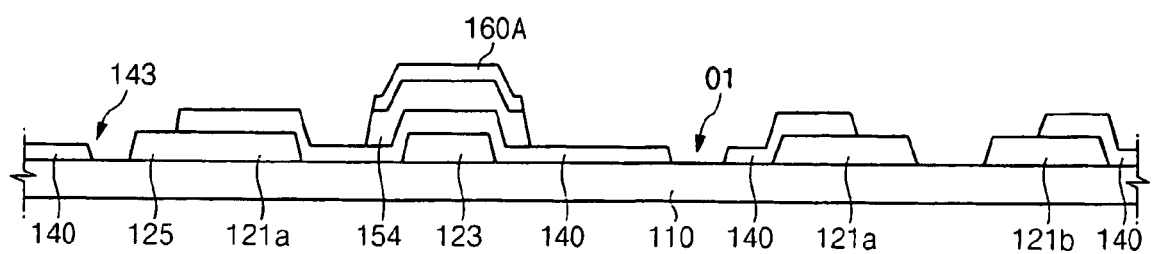
Figure 4C:
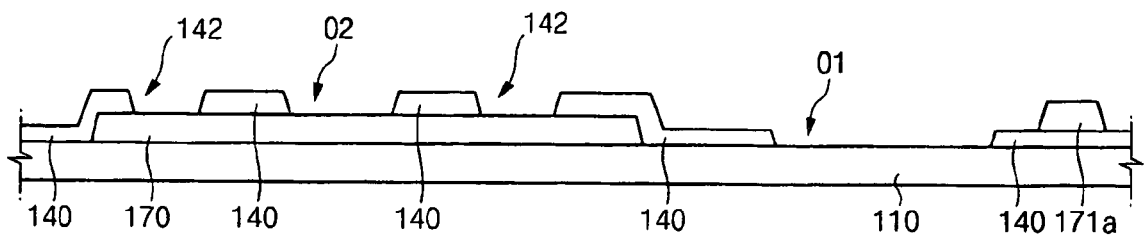

Referring to FIGS. 4A-4C, the gate insulating layer 140 is patterned to form first to third contact holes 141, 142 and 143. Simultaneously, portions of the gate insulating layer 140 in pixel areas and portions of the gate insulating layer 140 extending parallel to the gate wire 121, 123 and 125 are removed to form a plurality of first and second openings O1 and O2.

Third contact holes 143 may be formed when contact holes are formed in a passivation layer. However, since both the passivation layer and the gate insulating layer 140 may be removed, the contact holes in the passivation layer may be overetched to form undercut under the contact holes. Accordingly, it is preferable that the third contact holes 143 are formed along with the first and the second contact holes 141 and 142.

Figure 5A:
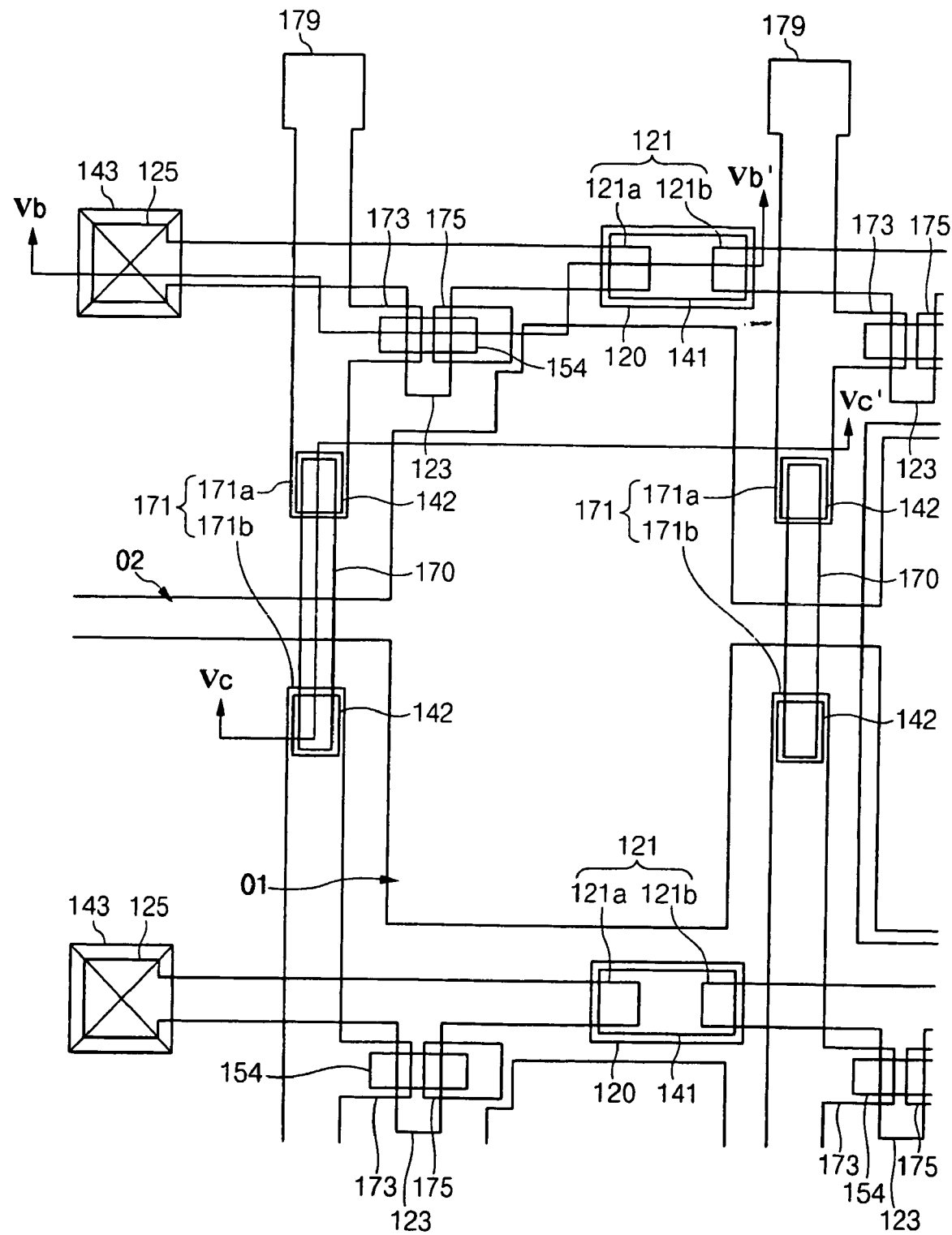
Figure 5B:
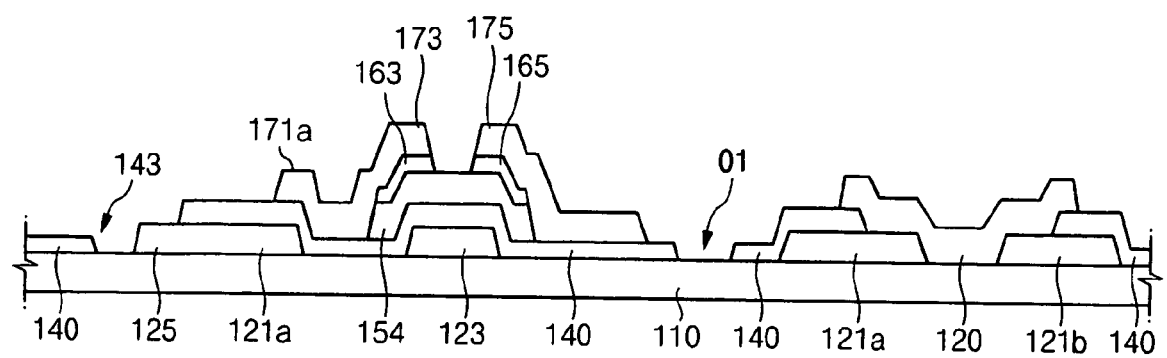
Figure 5C:
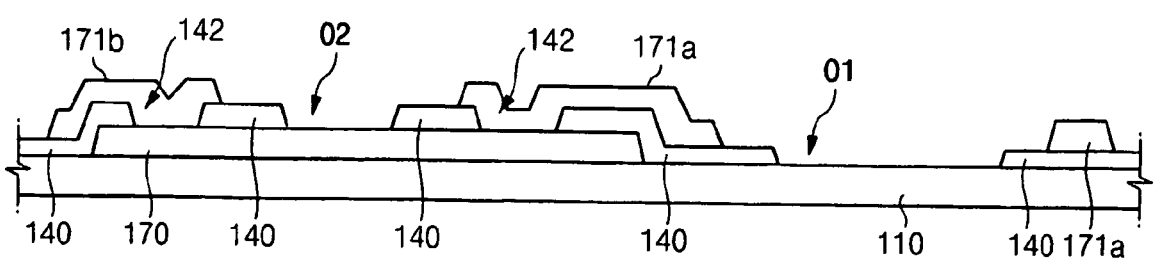

Referring to FIGS. 5A-5C, a metal layer is formed on the substrate provided with the ohmic contact layer pattern 160A, and patterned by photo-etching to form a data wire 171, 173, 175 and 179 and the gate connections 120.

Next, portions of the ohmic contact layer pattern 160A disposed between the source electrodes 173 and the drain electrodes 175 are removed using the data wire 171, 173, 175 and 179 as a mask to expose portions of the semiconductor layer 154.

Finally, a passivation layer 180 is formed entirely on the substrate provided with the data wire 171, 173, 175 and 179 and the gate connections. The passivation layer 180 is patterned to form a plurality of fourth to sixth contact holes 181-183. The fourth contact holes 181 expose the drain electrodes 175, the fifth contact holes 182 expose the third contact holes 143, and the sixth contact holes 183 expose the data pads 179.

In addition, a transparent metal layer is formed on the passivation layer 180 and patterned to form a plurality of pixel electrodes 190, a plurality of subsidiary gate pads 95, and a plurality of subsidiary data pads 97. The pixel electrodes 190 are connected to the drain electrodes 175 through the fourth contact holes 181, the subsidiary gate pads 95 are connected to the gate pads 125 through the fifth contact holes 182, and the subsidiary data pads 97 are connected to the data pads 179 through the sixth contact holes 183. (See FIGS. 1A-1C).

While the present invention has been described in detail with reference to the preferred embodiments, those skilled in the art will appreciate that various modifications and substitutions can be made thereto without departing from the spirit and scope of the present invention as set forth in the appended claims.

As described above, since portions of the gate wire and the data wire are removed to separate the wires into a plurality of portions, the stress exerted along the length of the wires are reduced.

In addition, the layers such as the gate insulating layer and the passivation layer formed on entire area of the substrate are partly removed to further reduce the stress on the substrate. Accordingly, the bend of the substrate is minimized to secure high quality of the TFT array panel.

What is claimed is:

1. A thin film transistor array panel comprising:
   an insulating substrate;
   a gate wire from a plurality of gate wires formed on the insulating substrate, the gate wire including a plurality of gate line portions and a gate connection connecting the gate line portions;
   a data wire from a plurality data wires insulated from the gate wires and intersecting the gate wires, the data wire comprising a plurality of data line portions and a data connection connecting the data portions;

a gate insulating layer insulating the gate wire and the data wire, a portion of the gate insulating layer being disposed between the plurality of gate line portions and the gate connection;

a thin film transistor including a gate electrode of the gate wire and a source electrode connected to the data wire; and a pixel electrode connected to a drain electrode of the thin film transistor, wherein the gate electrode, the gate line portions and the data connection are formed from a same first layer; and the gate connection, the source electrode, the drain electrode and the data line portions are formed from a same second layer;

wherein at least a portion of the gate insulating layer is formed on the first layer; and wherein the gate connection is formed between two of the plurality of data wires; and the data connection is formed between two of the plurality of gate wires.

2. The thin film transistor array panel of claim 1, further comprising a passivation layer covering the thin film transistor.

3. The thin film transistor array panel of claim 1, wherein the gate connection is connected to the gate line portions through first contact holes provided in the gate insulating layer.

4. The thin film transistor array panel of claim 1, wherein the data connection is connected to the data line portions through second contact holes provided in the gate insulating layer.

5. A thin film transistor array panel comprising:

an insulating substrate;

a gate wire from a plurality of gate wires, the gate wire being formed on the insulating substrate, and including first and second gate line portions and a gate connection connecting the first and second gate line portions;

a gate insulating layer formed on a portion of the gate wire, and including first and second contact holes;

a semiconductor layer formed on a predetermined area of the gate insulating layer;

an ohmic contact layer formed on the semiconductor layer and having a shape substantially the same as the semiconductor layer except for a predetermined area of the semiconductor layer;

a data wire from a plurality of data wires insulated from the gate wires and intersecting the gate wires, the data wire including first and second data line portions, and the data wire is connected to a source electrode overlapping the ohmic contact layer at least in part;

a passivation layer formed on the data wire and having a third contact hole exposing a drain electrode;

a pixel electrode formed on the passivation layer and connected to the drain electrode through the third contact hole, wherein a portion of the gate insulating layer is disposed between the first gate line portion and the gate connection, and between the second gate line portion and the gate connection;

wherein the first and the second gate line portions are connected to the gate connection through the first contact hole;

wherein a gate electrode, the first and second gate line portions and the data connection are formed from a same first layer; and the gate connection, the source electrode, the drain electrode and the first and second data line portions are formed from a same second layer; and wherein the gate connection is formed between two of the plurality of data wires; and the data connection is formed between two of the plurality of gate wires.

6. The thin film transistor array panel of claim 5, wherein the first and the second data line portions are connected to the data connection through the second contact hole.

7. The thin film transistor array panel of claim 6, wherein the first data line portion further comprises a data pad provided at an end of the data wire.

8. The thin film transistor array panel of claim 5, wherein the first gate line portion further comprises a gate pad provided at an end of the respective gate wire.

9. The thin film transistor array panel of claim 5, wherein the gate wire and the data wire intersect to define a pixel area, and portions of at least one of the gate insulating layer and the passivation layer near the pixel electrode are removed.

10. The thin film transistor array panel of claim 9, wherein at least one of the gate insulating layer and the passivation layer is divided into a plurality of portions by an opening extending parallel to the gate wire, and the opening is located between adjacent gate wires and connected to a predetermined area of the pixel area.

* * * * *